J. G. HODGSON & J. G. HODGSON, Jr.
DEMOUNTABLE RIM FOR VEHICLE WHEEL TIRES.
APPLICATION FILED MAR. 17, 1910.

981,265.

Patented Jan. 10, 1911.

Witnesses:
Wm. Geiger

Inventors:
John G. Hodgson
John G. Hodgson Jr.
By Munday, Evarts, Adcock & Clarke,
Attorneys

UNITED STATES PATENT OFFICE.

JOHN G. HODGSON AND JOHN G. HODGSON, JR., OF MAYWOOD, ILLINOIS.

DEMOUNTABLE RIM FOR VEHICLE-WHEEL TIRES.

981,265.

Specification of Letters Patent.

Patented Jan. 10, 1911.

Application filed March 17, 1910. Serial No. 549,926.

*To all whom it may concern:*

Be it known that we, JOHN G. HODGSON and JOHN G. HODGSON, Jr., citizens of the United States, residing in Maywood, in the county of Cook and State of Illinois, have invented a new and useful Improvement in Demountable Rims for Vehicle-Wheel Tires, of which the following is a specification.

Our invention relates to improvements in demountable rims for vehicle wheel tires.

The object of our invention is to provide a demountable rim for resilient tires of motor car or other vehicle wheels, which will be of a simple, efficient and durable construction, and adapted for use upon any and all different constructions of tire seating rim, such as clencher type, quick detachable side ring type or other type, which will enable the tire and its seating rim to be very easily, quickly and conveniently removed from and replaced on the wheel, and which will firmly and securely hold the demountable members in place without exerting any bursting strain thereon.

Our invention consists in the means we employ to practically accomplish this object or result as herein shown and described and more particularly specified in the claims.

Figure 1:
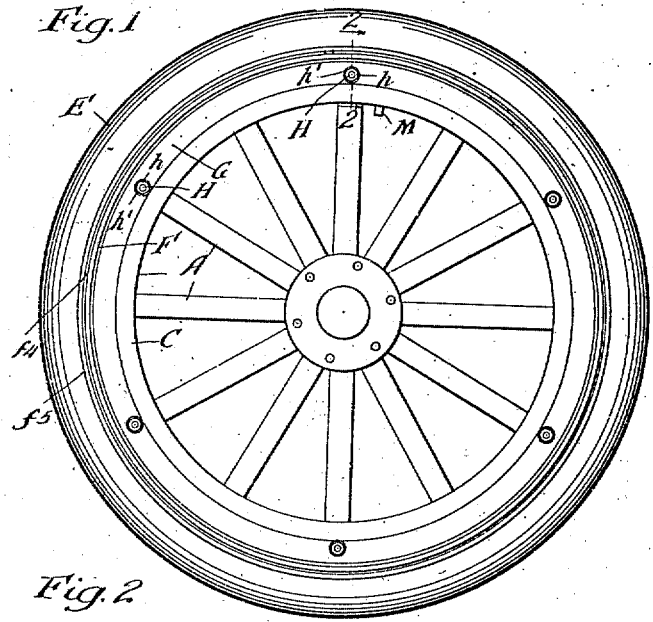
Figure 2:
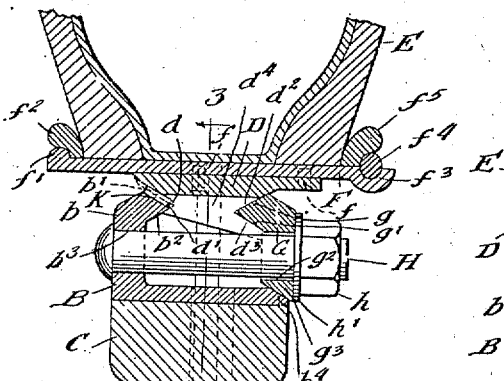
Figure 3:
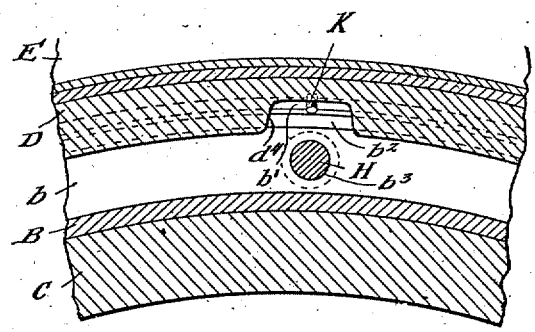
Figure 4:
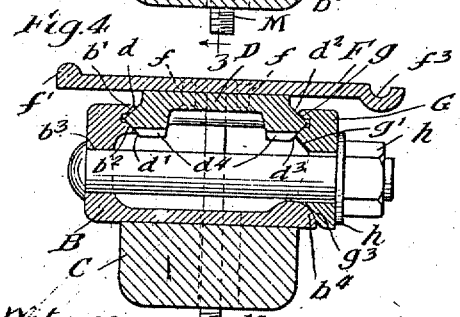

In the accompanying drawing forming a part of this specification, Figure 1 is a side elevation of a resilient tired vehicle wheel embodying our invention. Fig. 2 is an enlarged detail partial section on line 2—2 of Fig. 1. Fig. 3 is a partial vertical section on line 3—3 of Fig. 2 and Fig. 4 illustrates a modification.

In the drawing, A represents a motor car or other vehicle wheel, B a metal band shrunk upon the wood felly C in the usual manner, and having on the inner side of the wheel an integral upright flange or rib $b$, provided at the upper part thereof with double wedge or cone faces $b^1$ $b^2$ adapted to engage the double wedge or double cone faces $d$ $d^1$ of the coöperating band or ring D, to which the demountable tire seating rim F of the resilient tire E is secured. The ring or band D is preferably made in a separate piece from the tire seating rim F and secured thereto by rivets $f$, instead of being made integral with the tire seating rim. This is not only a convenience in construction of the parts, but enables our demountable rim attachments to be readily applied to any desired or well known construction of tire seating rim.

G is a coöperating double wedge or double cone faced clamp ring, the double wedge or double cone faces $g$ $g^1$ of which engage the coöperating double wedge or double cone faces $d^2$ $d^3$ of the band or ring D.

H H are clamp bolts which pass at intervals transversely through the metal band B and clamp ring G, the same being furnished with threaded nuts $h$ and washers $h^1$.

The tire seating rim F may be of any desired or well known construction, and the same also applies to the resilient tire E. In the drawing, we have for convenience, illustrated the resilient tire as of the pneumatic type, and the tire seating rim F of a well known quick detachable side ring type, that is to say, with a flange or shoulder $f^1$ and side ring $f^2$ on the inner side and with a groove $f^3$, removable split ring $f^4$ and side ring $f^5$ on the outer side. The transverse bolts H pass through suitable holes $b^3$ in the upright flange or rib $b$ of the metal band B and through suitable holes $g^2$ in the double wedge faced clamp ring G, said holes $g^2$ being made oblong or large enough to permit the clamp ring and the double wedge faced demountable ring D to properly seat themselves without interference from the bolt when the nuts of the clamp bolts are screwed home. And to prevent the inner portion of the demountable ring D engaging the clamp bolts, it is provided with notches or cut out portions $d^4$ at the bolts H. At its inner edge, the clamp ring G is preferably furnished with a beveled or cone face $g^3$ engaging a corresponding bevel or cone face $b^4$ on the metal band B.

Tapered keys, lugs or dowel pins or shoulders such as K or $K^1$ are preferably employed for preventing slipping of the ring D in respect to the rings B and G.

M represents the valve tube, which may be brought out in any suitable or usual way, as for example, through the felly, as illustrated in the drawing.

As in our invention, the interengaging rings B, D, G have double cone or double wedge faces, the forcing or clamping of the rings together by the clamp bolts H exerts no outward or bursting strain upon the demountable tire seating rim F or demountable ring D secured thereto. The upright flange or rib $b$, in connection with the clamp ring G also serves to very materially reinforce and strengthen the metal band B.

In operation, the nuts are removed from the transverse clamp bolts H and then the tire seating rim F and detachable ring D may be very easily and quickly slipped off and replaced with another when required.

In the modification illustrated in Fig. 4, the construction is the same, excepting that the double wedge or double cone faces on the demountable ring $D^1$ are made external or rib-like instead of V or groove like, and the coöperating wedge faces on the members B and G are complementary shaped, that is to say, grooved or V shaped instead of external or rib shaped.

In our invention dirt is entirely excluded from between the tire seating rim, and the metal band surrounding the felly of the wheel has the double cone contacting faces of the interengaging rings form tight joints. And in our invention also, owing to the double cone contacting faces of the interengaging rings, no difficulty is or can be experienced in separating the parts by reason of their becoming rusted.

We claim:—

1. In a demountable vehicle wheel rim, the combination with a metal rim shrunk upon the felly, and provided on its inner side with an outwardly projecting flange furnished with double wedge faces at its outer portion, a clamp ring having opposing double wedge faces, and a tire seating rim having on its inner face a ring member furnished with double wedge faces engaging said double wedge faces of said metal band and clamp ring, and means for clamping and holding said metal rim and said clamp ring together substantially as specified.

2. In a demountable vehicle wheel rim, the combination with a metal rim shrunk upon the felly, and provided on its inner side with an outwardly projecting flange furnished with double wedge faces at its outer portion, a clamp ring having opposing double wedge faces, a tire seating rim having on its inner face a ring member furnished with double wedge faces engaging said double wedge faces of said metal band and clamp ring, and clamp bolts extending transversely through said flange metal rim and said clamp ring, substantially as specified.

3. In a demountable vehicle wheel rim, the combination with a metal rim shrunk upon the felly, and provided on its inner side with an outwardly projecting flange furnished with double wedge faces at its outer portion, a clamp ring having opposing double wedge faces, a tire seating rim having on its inner face a ring member furnished with double wedge faces engaging said double wedge faces of said metal band and clamp ring and clamp bolts extending transversely through said flanged metal rim and said clamp ring, said ring member on said demountable rim having notches or cut out portions to accommodate said clamp bolts, substantially as specified.

4. In a demountable vehicle wheel rim, the combination with a metal rim having a flange on one side thereof provided with double cone faces, of a clamp ring having double cone faces and a demountable tire seating rim having a member provided with double cone faces adapted to be clamped between said metal rim and clamp ring without exerting outward or bursting strain upon said tire seating rim, and means for clamping and holding said metal rim and said clamp ring together substantially as specified.

5. In a demountable vehicle wheel rim, the combination with a metal rim having a flange on one side thereof provided with double cone faces, of a clamp ring having double cone faces and a demountable tire seating rim having a member provided with double cone faces adapted to be clamped between said metal rim and clamp ring without exerting outward or bursting strain upon said tire seating rim, and clamp bolts extending transversely through said flanged metal rim and said clamp ring, substantially as specified.

6. In a demountable vehicle wheel rim, the combination with a metal rim having a flange on one side thereof provided with double cone faces, of a clamp ring having double cone faces and a demountable tire seating rim having a member provided with double cone faces adapted to be clamped between said metal rim and clamp ring without exerting outward or bursting strain upon said tire seating rim, and means for clamping and holding said metal rim and said clamp ring together and means for preventing circumferential slipping of said rings, substantially as specified.

JOHN G. HODGSON.
JOHN G. HODGSON, Jr.

Witnesses:
PEARL ABRAMS,
H. M. MUNDAY.